March 9, 1965 R. LEE 3,173,071
SYNCHRONOUS MOTORS
Filed June 3, 1960 2 Sheets-Sheet 1

INVENTOR.
ROYAL LEE
BY
*Christopher L. Wall*
ATTORNEY

March 9, 1965 R. LEE 3,173,071
SYNCHRONOUS MOTORS
Filed June 3, 1960 2 Sheets-Sheet 2
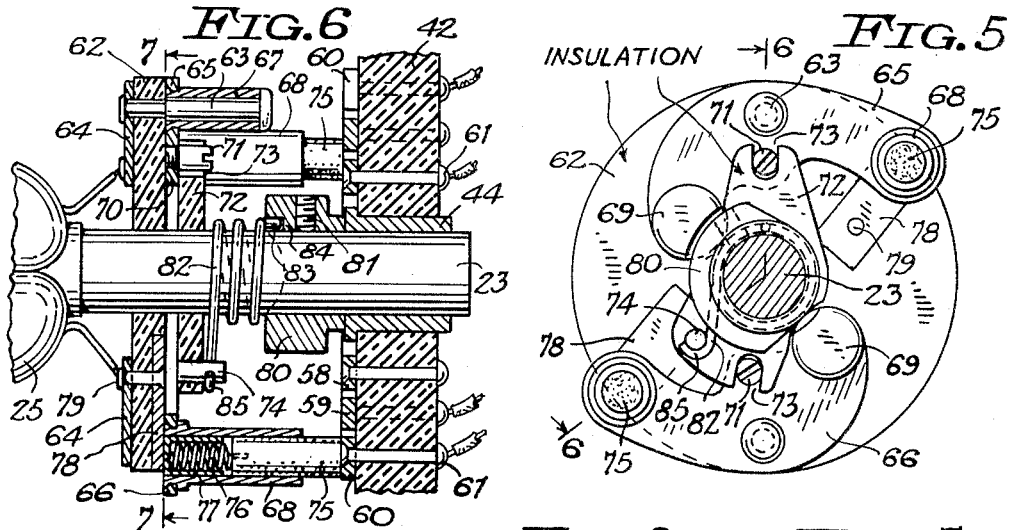
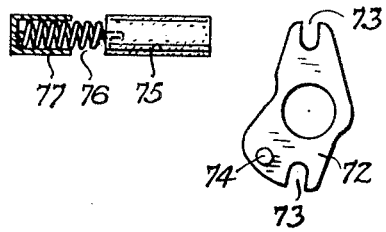
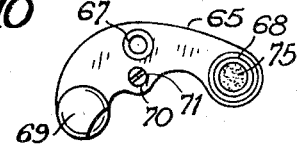
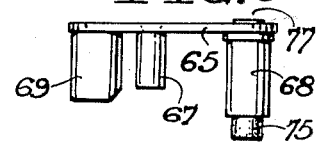
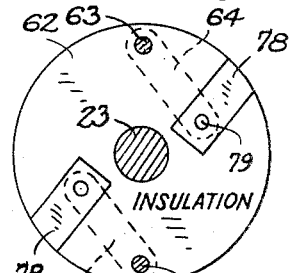
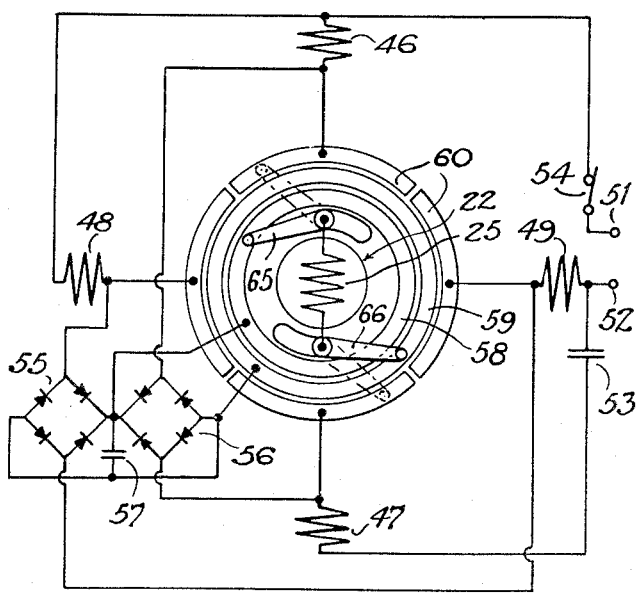
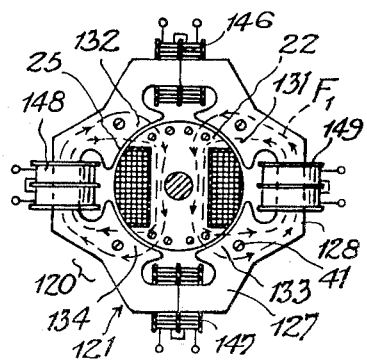
INVENTOR.
ROYAL LEE
BY Christopher L. Waal
ATTORNEY

United States Patent Office 3,173,071
Patented Mar. 9, 1965

3,173,071
SYNCHRONOUS MOTORS
Royal Lee, P.O. Box 267, Elm Grove, Wis.
Filed June 3, 1960, Ser. No. 33,803
12 Claims. (Cl. 318—186)

This invention relates to alternating current motors and more particularly to motors of the synchronous type.

An object of the invention is to provide a simple, inexpensive and efficient synchronous motor adapted for energization from a single-phase power source.

Another object is to provide a self-starting synchronous motor which will possess ample starting torque.

Still another object is to provide an improved synchronous motor including load-responsive means for automatically varying rotor excitation.

A further object is to provide a synchronous motor having stator and rotor windings and including rectifier means responsive to load current for supplying unidirectional rotor current to the rotor winding.

A still further object is to perfect details of construction generally.

The invention further consists in the novel features hereinafter claimed.

In the accompanying drawings, illustrating certain embodiments of the invention, FIG. 1 is an end view, partly in section, of a two-phase or split-phase wound-rotor synchronous motor constructed in accordance with the invention, the view also showing flux paths established when the current in one phase winding is at a maximum;

FIG. 5 is an enlarged transverse sectional view taken generally on the line 5—5 of FIG. 3, showing centrifugally actuated brush gear of the motor, the parts being shown with the motor in starting position;

FIG. 6 is an enlarged fragmentary sectional view taken generally on the line 6—6 of FIG. 5;

FIG. 7 is a transverse sectional view taken generally on the line 7—7 of FIG. 6;

FIG. 8 is a detail front view of one of the brush-carrying levers;

FIG. 9 is a detail side view of the brush-carrying lever of FIG. 8;

FIG. 10 is a detail front view of a control lever for the brush-carrying levers;

FIG. 11 is a detail side view, partly in section, of a brush assembly;

FIG. 12 is a schematic wiring diagram of the motor, brush-carrying parts of the motor being shown in full lines in running position and in broken lines in starting positions, and FIG. 13 is a sectional view, generally similar to FIG. 1, showing a synchronous motor with a modified stator, and also showing flux paths established when the current in one phase winding is at a maximum.

Figure 1:
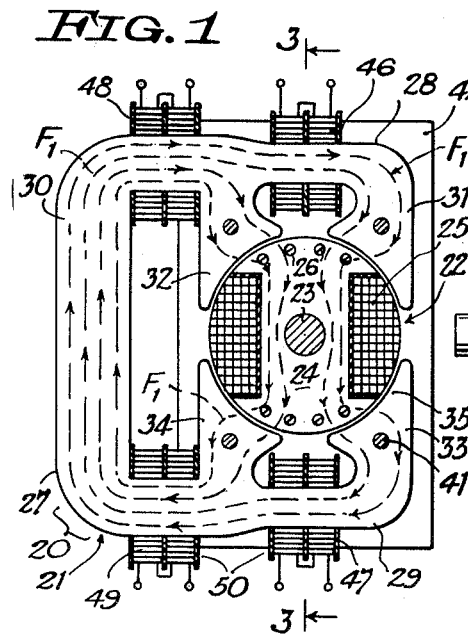
Figure 3:
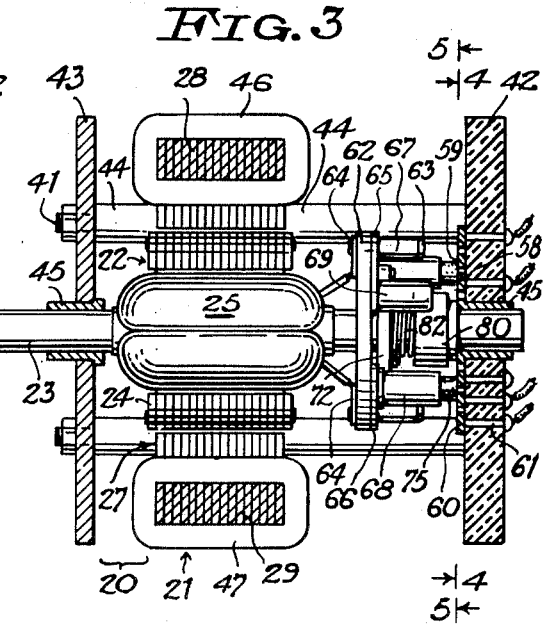
FIG. 3 is a longitudinal sectional view of the motor, taken generally on the line 3—3 of FIG. 1.

Referring to the form of the invention shown in FIGS. 1 to 12, 20 designates generally a two-phase or split-phase synchronous motor of the invention, the motor comprising a wound stator 21 and a cooperating wound rotor 22, and the latter haivng a shaft 23. Preferably, the stator 21, hereinafter more fully described, is similar to or identical with the stator disclosed in my copending application for Electric Motors and Stators Therefor, Serial No. 2,011, filed January 12, 1960, now Patent No. 3,052,806, issued September 4, 1962. The rotor 22, which is hereinafter more fully described, includes a shuttle-type laminated core 24 carrying thereon an exciting winding 25. In some instances, the head portions of the rotor core are provided with damper winding bars 26.

The stator 21 has a laminated magnetizable core 27 including an open-ended C-shaped yoke formed by a pair of generally parallel arms 28 and 29 integrally connected at adjacent ends by a cross portion 30, the cross portion extending at right angles to the arms and being somewhat wider than the arms. A pair of salient polar projections or pole pieces 31 and 32 are each integrally formed on the inner side of the yoke arm 28, and a similar pair of spaced salient polar projections or pole pieces 33 and 34 are formed on the inner side of the other yoke arm 29, the core being symmetrical about a plane passing midway between the arms. The four polar projections have respective evenly spaced concave pole faces 35 which lie in a cylindrical surface and define a recess or tunnel receiving the rotor core 24. Each pole face extends over an arc of about 75 to 80°, and the centers of the pole faces are spaced 90°. Radii extending from the shaft axis to the centers of the pole faces are disposed at 45° to the length of the stator arms. The adjacent pole tips are spaced to facilitate application of phase windings hereinafter described. The stator core laminations are each of one-piece construction and are suitably clamped together, as by screw studs 41 passing transversely through the polar projections. The screw studs 41 also secure end plates 42 and 43, FIG. 3, and carry spacer sleeves 44. The end plates are provided with respective bearing bushings 45 in which the rotor shaft 23 is journalled.

Figure 2:
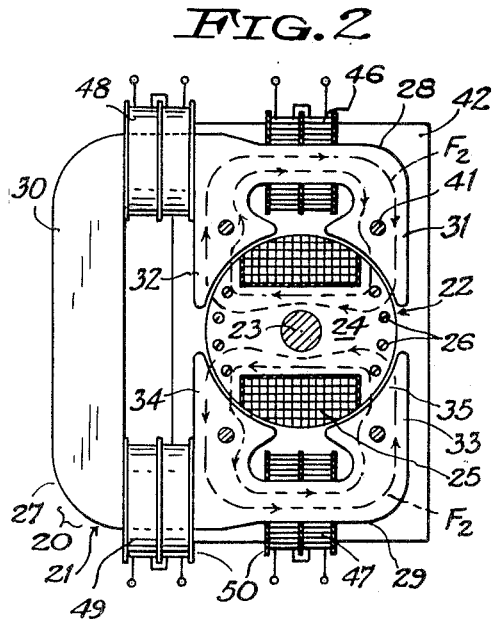
FIG. 2 is a similar view of the motor, showing flux paths established when the current in another phase winding is at a maximum.
Figure 4:
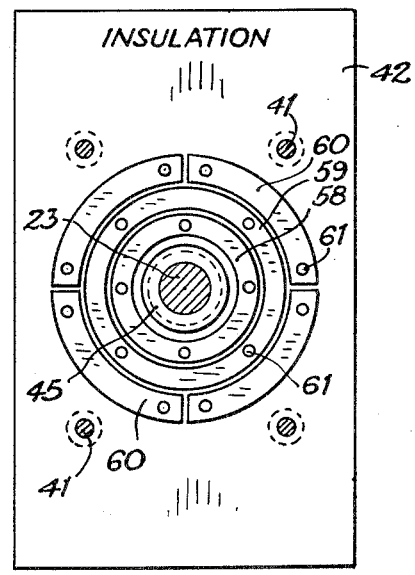
FIG. 4 is a transverse sectional view taken generally on the line 4—4 of FIG. 3, and showing a motor end frame member having thereon a stationary commutator and collector rings.

Phase winding sections 46, 47, 48, and 49 are wound on the stator yoke arms, and are preferably of the spirally wound ribbon or tape type. The winding section 46 surrounds the yoke arm 28 between the spaced polar projections 31 and 32, and the winding section 47 surrounds the yoke arm 29 between the spaced polar projections 33 and 34. The two winding sections 46 and 47, which are series-connected, form a phase winding of the motor and are so poled that at any instant the flux produced thereby flows in the same direction in the two core arms, as indicated in FIG. 2. The length of the portion of each yoke arm between the two polar projections thereon is considerably greater than the opening or gap between the adjacent pole tips of these projections. The winding section 48 surrounds the yoke arm 28 between the yoke cross portion 30 and the polar projection 32, and the winding section 49 surrounds the yoke arm 29 between the yoke cross portion and the polar projection 34. The two winding sections 48 and 49, which are series-connected, form the second phase winding of the motor and are so poled that at any instant the flux produced thereby is additive and flows in opposite directions in the two yoke arms, as indicated in FIG. 1. The two phase windings together constitute a polyphase winding. The portions of the core arms carrying the winding sections 48 and 49 are preferably wider than the arm portions carrying the winding sections 46 and 47 so as to provide adequate flux-carrying capacity. Each winding section may consist of two or more coil units, two being shown, and each coil unit after completion is shiftable along the core arm to accommodate the succeeding unit. The spirally wound coil units of each winding section are preferably spaced, as by thin slit insulating plates 50, and the windings are suitably retained in position, as by insulating varnish. In some cases, the conductor tape of each coil unit may be wound in bifilar fashion, so as to provide a capacitance effect.

The stator field winding or phase winding consisting of the series-connected sections 48 and 49 is connected to single-phase line terminals 51 and 52, FIG. 12, and the other stator field winding or phase winding, consisting of the series-connected sections 46 and 47, is also connected to these line terminals, but through a phase-shifting element such as a capacitor 53. Either of the phase winding circuits may include the phase-shifting element. If a two-phase power source is available, the two phase windings are connected to the respective line phases. One of the line conductors is here shown to include an on-off switch 54.

A full-wave bridge-type dry-contact rectifier 55 has its input connected in series between the phase winding sections 48 and 49, and a similar rectifier 56 has its input connected in series between the phase winding sections 46 and 47. The outputs of the two rectifiers are connected in parallel and to the rotor winding 25 when the motor is in synchronous operation, as hereinafter described. In some instances, a capacitor 57 is connected across the rectifier outputs. Each rectifier may be of the silicon type.

The end plate 42 of the motor is in the form of a flat insulating plate having concentrically mounted on the inner face thereof a pair of flat inner and outer collector rings 58 and 59 and a flat four-segment commutator 60 which surrounds the outer collector ring, the contact faces of the collector rings and commutator segments lying in a common plane normal to the rotor axis, and the rings and segments being secured to the plate by rivets 61 some of which form wiring terminals. As indicated in FIG. 12, a pair of diametrically opposite commutator segments are connected to terminals of the phase winding sections 46 and 47, and the other pair of commutator segments are connected to terminals of the phase winding sections 48 and 49. The collector rings 58 and 59 are connected to the combined outputs of the rectifiers 55 and 56.

An insulating disk 62 is rigidly mounted on the rotor shaft 23 near the rotor winding and is spaced from the adjacent insulating end plate 42 of the motor. A pair of diametrically opposite headed pivot pins 63 are fixedly secured to the disk 62 near the margin thereof, the pins extending parallel to the rotor axis and projecting toward the motor end plate 42. At the face of the disk confronting the rotor winding 25 the pivot pins are secured to metal plates or straps 64 to which the terminals of the rotor winding are connected.

Pivotally mounted on the two pivot pins 63 are respective flat brush-carrying levers 65 and 66 of generally similar arcuate shape, the levers being closed to the disk 62, and the planes of the levers lying normal to the shaft axis. Each lever is provided at its intermediate portion with a bearing sleeve 67 riveted thereto and projecting from the outer face thereof, the sleeve receiving therethrough the associated pivot pin 63. Each of the levers 65 and 66 has riveted to an end portion thereof a tubular brush-holder sleeve 68 open at both ends, the sleeve 68 extending parallel to the rotor axis. At its opposite end portion each of the levers carries a generally cylindrical weight member 69 which projects therefrom in parallel relation to the rotor axis. At its middle portion each lever is formed with an inwardly projecting ear 70 carrying a stud 71 extending parallel to the rotor axis.

A centrally apertured plate-like control lever 72 of insulating material is rockably mounted on the rotor shaft 23 adjacent to the brush-carrying levers and has approximately opposite radially extending end slots or notches 73 which slidably receive the respective studs 71 of the brush-holder levers. The control lever 72 carries a pin or stud 74 at an end portion thereof, and the opposite side edges of the control lever are cut away to provide clearance for the displaceable weight members 69 when the latter are in their inner position. Cylindrical brushes 75 slidably fit in the respective brush holder sleeves 68 and are urged toward the motor end plate 42 by respective compressed coil springs 76 in the sleeves. One end of each brush spring is attached to the inner end of the brush, and the other end of the spring is attached to the flat end wall of a cylindrical metal cup 77 slidably fitting in the brush holder sleeve. The cup end walls slidably bear on respective flat metal contact plates 78 countersunk into the insulating disk 62, the contact plates being fastened to the connector straps by rivets 79.

A collar 80 is adjustably secured to the rotor shaft 23 adjacent to the bearing sleeve 44 by a set screw 81 and is axially spaced from the control lever 72, the collar being cut away at its periphery to provide clearance for the weight members 69. A coiled torsion spring 82 surrounds the shaft between the collar and the control lever and has a bent end 83 anchored in an opening 84 in the collar and a hooked opposite end 85 engaging the stud 74 of the control lever, thus urging the control lever in an angular direction which places the brushes 75 in their outermost position at which they ride on the four-segment commutator 60. This angular displacement of the control lever is limited by the inward abutment of the lever-carried weight members 69 with the control lever 72. The weight members on the levers 65 and 66 are movable outwardly by centrifugal force as the rotor approaches synchronous speed, thus angularly shifting the levers on their pivot pins to move the spring-pressed brushes 75 inwardly off the commutator, so that the brush carried by the lever 65 will ride on the inner collector ring 58 and the brush carried by the lever 66 will ride on the outer collector ring 59, the inward travel of the brush holder sleeve on the lever 65 being limited by its engagement with the control lever 72. During the inward and outward travel of the brushes the flat-bottomed metal cup members 77, electrically connected to the brushes by the coiled springs 76, slide on the countersunk metal contact plates 78 under the pressure of these springs, so as to complete the circuit from the rotor winding to the brushes. The centrifugally influenced travel of the brush carried on the lever 65 is greater than that of the brush carried on the lever 66. This difference in travel is established by the geometry of the movable parts, it being noted that the studs 71 on the respective brush-carrying levers are at different distances from the pivot pins for these levers. The torsion of the coiled spring 82 is adjusted by turning the collar 80 on the rotor shaft, thus determining the rotor speed at which the brush shift is effected.

When the motor of FIGS. 1 to 12 is at rest, the torsion spring 80 surrounding the rotor shaft holds the brush-carrying levers 65 and 66 in the positions shown in FIGS. 5 and 6 in which the outwardly displaced rotor brushes 75 bear on the stationary commutator 60 ready for a motor starting operation. Upon connection of the motor to the single-phase power source 51, 52, alternating current flows through the phase winding sections 48 and 49, and through the then intervening series-related rotor winding 25 by way of the rotor brushes and two opposed segments of the stationary commutator, thus exerting a torque on the rotor and initiating rotation of the rotor. The rotor brushes then ride off the opposed commutator segments and onto the other pair of opposed commutator segments connected to the phase winding sections 46 and 47, which latter are energized in time-spaced phase relation to the phase winding sections 48 and 49. The cycle of operation is repeated, causing rapid acceleration of the rotor, the motor operating, in effect, as a series motor, and having good torque characteristics. During the starting operation, the rectifiers 55 and 56 are inactive, the output terminals thereof being on open circuit. As the rotor approaches synchronous speed, the rotor brushes are centrifugally shifted inwardly and respectively ride on the collector rings 58 and 59, thus disconnecting the rotor winding 25 from the stationary commutator and connecting this winding to the combined output of the full-wave rectifiers 55 and 56, the inputs of which are connected in series relation to the respective phase windings 48, 49 and 46, 47. The phase winding consisting of the field winding sections 48 and 49 produces an alternating magnetic flux $F_1$, FIG. 1, which passes through the yoke arms 28 and 29 and the yoke cross portion 30, and which also passes vertically through the rotor. One-half of the flux $F_1$ passes through the rotor between the polar projections 31 and 33 at the outer ends of the yoke arms, while the other half of this flux passes through the rotor between the inner polar projections 32 and 34. The placement of the field winding sections 48 and 49 on the stator yoke arms close to the polar projections 32 and 34 minimizes magnetic leakage. The other phase winding consisting of the field winding sections 46 and 47 produces an alternating magnetic flux $F_2$, FIG. 2, which passes horizontally through the rotor. One-half the flux $F_2$ is produced by the winding section 46 and passes through the rotor between the polar projections 31 and 32, while the other half of the flux $F_2$ is produced by the winding section 47 and passes through the rotor between the polar projections 33 and 34. The two components of the field flux $F_2$ produced by the winding sections 46 and 47 have the same magnetic potential at any instant at the junctions of the inner polar projections 32 and 34 with the core arms 28 and 29, so that except for a negligible amount of leakage flux, not shown, substantially none of the flux $F_2$ will pass through the cross portion 30 of the stator core yoke. The alternating field fluxes $F_1$ and $F_2$ are out of phase by a substantial angle, which may approach 90 electrical degrees in some instances, thus providing a rotating magnetic field which passes through the excited rotor, causing synchronous rotation of the rotor. The motor runs as a split-phase two-pole synchronous motor with its rotor winding excited by unidirectional current supplied by the rectifiers 55 and 56. The unidirectional rotor current varies with the load on the motor, increasing as the load increases, and decreasing with decrease of load. The rotor current peaks are approximately in phase with the current alternations in the stator windings. While idling and under light loads the motor runs quite cool, and a good efficiency is obtained over a wide range of loads. In the running condition of the motor the brushes are at their inwardly shifted positions, thus reducing brush wear and friction.

The form of two-phase or split-phase synchronous motor 120 shown in FIG. 13 has the same rotor 22 as the motor of FIG. 1, but has a modified form of stator 121 which, however, provides the same type of rotating magnetic field as the stator of FIG. 1. The stator comprises an annular laminated core 127 surrounding the rotor and having four inwardly directed pole pieces 131, 132, 133, and 134, corresponding to the pole pieces 31, 32, 33, and 34 of FIG. 1, each pole face having a concave pole face 25. The core includes four yoke portions 128 each connecting adjacent pole pieces and provided with respective surrounding phase winding sections 146, 147, 148, and 149, corresponding to the phase winding sections 46, 47, 48, and 49 of FIG. 1. The opposite winding sections 146 and 147 form one phase winding, and the opposite winding sections 148 and 149 form a second phase winding, these phase windings being connected in the motor circuit as in FIG. 12. The stator core laminations are suitably clamped together, as by screw studs 41. The annular stator core is here shown to be formed by complementary C-shaped halves suitably divided, as at the mid points of opposite yoke portions, so as to facilitate application of the stator windings, but in some instances the annular stator core laminations may be of one-piece construction. The motor further includes end plates and brush gear as in FIG. 3.

As shown in FIG. 13, the two winding sections 148 and 149 of one phase winding provide components of field flux $F_1$ passing vertically through the rotor, much as in FIG. 1. The winding sections 146 and 147 of the other phase winding will provide components of a second field flux, not indicated, passing horizontally through the rotor as in FIG. 2. The two field fluxes are established in time-spaced relation, providing a rotating magnetic field acting on the rotor, as in the motor of FIG. 1.

The motor of FIG. 13 starts and runs in the same manner as the motor of FIGS. 1 and 12, and has the same characteristics.

I claim:

1. A synchronous motor comprising a stator having a pair of phase windings adapted to be energized from an alternating current source in time-spaced relation, a rotor cooperating with said stator and having a winding, and rectifier means having an input connected in series with at least one of said phase windings and having an output connected to said rotor wiinding for supplying unidirectional exciting current to said rotor winding.

2. A synchronous motor comprising a stator having a pair of phase windings adapted to be energized from an alternating current source in time-spaced relation, a rotor cooperating with said stator and having a winding, and a pair of full-wave rectifiers having inputs connected in series with said respective phase windings and having a common output connected to said rotor winding for supplying unidirectional exciting current to said rotor winding.

3. A synchronous motor comprising a stator with winding means adapted to be energized by atlernating current, a rotor cooperating with said stator and having a winding, and rectifier means having an input connected in series with said stator winding means and having an output connected to said rotor winding for supplying unidirectional exciting current to said rotor winding, the output current of said rectifier means increasing with the load current flowing through the stator winding means.

4. A synchronous motor comprising a stator having first and second phase windings each including a pair of winding sections, a rotor cooperating with said stator and having a winding, the winding sections of each phase winding having terminals adapted to be connected to an alternating current source, a pair of full-wave rectifiers each having an input and an output, said rectifier inputs being connected between the winding sections of the respective phase windings, and means for connecting the output of said rectifiers to said rotor winding for supplying unidirectional exciting current to said rotor winding.

5. A synchronous motor comprising a stator having first and second phase windings each including a pair of winding sections, a rotor cooperating with said stator and having a winding, the winding sections of each phase winding having terminals adapted to be connected to an alternating current source, a stationary commutator having segments connected to the other terminals of the phase winding sections, a pair of stationary collector rings, a pair of brushes carried by said rotor and connected to the rotor winding, a pair of rectifiers having respective inputs connected between winding sections of said respective phase windings and having outputs connected to said collector rings, said brushes being shiftable between first positions in which they bear on said commutator and second positions in which they bear on said respective slip rings, speed responsive means for shifting said brushes from said first positions to said second positions, said brushes when in engagement with said commutator connecting said phase winding sections in series with the rotor winding for starting the motor, and said brushes when shifted by said speed responsive means into engagement with said collector rings supplying said rotor winding with unidirectional exciting current for synchronous operation of the motor.

6. A synchronous motor comprising a stator having energizing winding means for producing a rotating magnetic field and adapted for connection to an alternating current source, a rotor cooperating with said stator and having a winding, a stationary commutator and a pair of stationary collector rings all coaxial with said rotor, said commutator being electrically connected to said stator winding means, and said collector rings being adapted for connection to a source of unidirectional current, brushes rotatable with said rotor and electrically connected to said rotor winding, said brushes being shiftable between first positions in which they bear on said commutator and second positions in which they bear on said respective collector rings, speed responsive means for shifting said brushes from said first positions to said second positions, said brushes being in their first positions for starting the motor as a commutating motor and being urged to their second positions by said speed responsive means for supplying unidirectional exciting current to said rotor winding for synchronous operation of the motor.

7. A synchronous motor comprising a stator having a pair of phase windings each including a pair of winding sections, a rotor cooperating with said stator and having a winding, a stationary starting commutator coaxial with said rotor and having segments connected to terminals of said phase winding sections, the other terminals of said phase winding sections being adapted for connection to an alternating current source, a pair of stationary collector rings coaxial with said rotor, means for supplying unidirectional current to said collector rings, a pair of brushes carried by said rotor for rotation therewith and connected to said rotor winding, and speed-responsive means for shifting said brushes from said commutator to said respective collector rings, said brushes when in engagement with said commutator connecting said phase winding sections in series with the rotor winding for starting the motor, and said brushes when shifted by said speed responsive means into engagement with said collector rings supplying said rotor winding with unidirectional exciting current for synchronous operation of the motor.

8. A synchronous motor comprising a stator having energizing winding means for producing a rotating magnetic field and adapted for connection to an alternating current source, a rotor cooperating with said stator and having a winding, a stationary commutator and a pair of stationary collector rings all coaxial with said rotor, said commutator being electrically connected to said stator winding means, and said collector rings being adapted for connection to a source of unidirectional current, a pair of centrifugally actuated brush holders pivotally carried by said rotor to turn about axes parallel to the rotor axis, brushes carried by the respective holders and connected to the rotor winding, said brushes being shiftable between first positions in which they bear on said commutator and second positions in which they bear on the respective collector rings, a control lever coaxial with said rotor and relatively angularly shiftable about the rotor axis, said control lever having opposite ends operatively connected to said brush holders, spring means operatively connected to said control lever for yieldably resisting centrifugal shifting of said brushes from their first positions to their second positions, said brushes being in the first positions for starting the motor as a commutating motor and being centrifugally urged to the second positions for supplying unidirectional exciting current to said rotor winding for synchronous operation of the motor.

9. A synchronous motor comprising a stator having energizing winding means for producing a rotating magnetic field and adapted for connection to an alternating current source, a rotor cooperating with said stator and having a winding, a stationary commutator and a pair of stationary collector rings all coaxial with said rotor, said commutator being electrically connected to said stator winding means, and said collector rings being adapted for connection to a source of unidirectional current, said commutator and collector rings having axially facing coplanar contact surfaces, and said commutator surrounding the collector rings, brushes rotatable with said rotor and electrically connected to said rotor winding, said brushes being shiftable between first positions in which they bear on said commutator and second positions in which they bear on said respective collector rings, speed responsive means for shifting said brushes from said first positions inwardly to said second positions, said brushes being in their first positions for starting the motor as a commutating motor and being urged to their second positions by said speed responsive means for supplying unidirectional exciting current to said rotor winding for synchronous operation of the motor.

10. A synchronous motor comprising a stator having polyphase primary winding means adapted to be energized from an alternating current source, a rotor cooperating with said stator and having a winding, means for connecting said stator winding means to said rotor winding and for commutating said stator winding means to start the motor, and rectifier means for supplying unidirectional exciting current to said rotor winding for synchronous operation of the motor.

11. In a synchronous motor having a stator with energizing winding means and a cooperating motor with a winding, a stationary commuator adapted for connection to said stator winding means, a pair of stationary collector rings adapted for connection to a source of unidirectional current, said commutator and collector rings having coplanar contact surfaces normal to the rotor axis, a support carried by said rotor and axially spaced from said commutator and collector rings, a pair of centrifugally actuated levers carried by said support on opposite sides of the rotor axis to swing on respective axes parallel to the rotor axis, spring-pressed brushes carried by said respective levers and adapted for connection to the rotor winding, said brushes being shiftable with said lever between first positions in which they bear on the commutator and second positions in which they bear on the respective collector rings, a control lever rockably carried by said rotor to swing about the rotor axis and having opposite ends operatively connected with said centrifugally actuated levers, and spring means acting on said control lever for urging said brushes to their first positions, said brush-carrying levers being centrifugally urged against the action of said spring means to shift said brushes to their second positions in which they bear on the respective collector rings.

12. In a synchronous motor having a stator with energizing winding means and a cooperating rotor with a winding, a stationary commutator adapted for connection to said stator winding means, a pair of stationary collector rings adapted for connection to a source of unidirectional current, said commutator and collector rings having coplanar contact surfaces normal to the rotor axis, a support carried by said rotor and axially spaced from said commutator and collector rings, a pair of centrifugally actuated levers carried by said support on opposite sides of the rotor axis to swing on respective axes parallel to the rotor axis, tubular brush holders carried by said respective levers and extending parallel to the rotor axis, brushes slidable in said respective holders and projecting from the ends thereof remote from said support, contactors slidable in the other end portions of said holders, compressed coiled springs each interposed between the brush and contactor in each holder, contact members carried by said support and slidably engageable by the respective contactors under the pressure of said coiled springs, said contact members being adapted for electrical connection with said rotor winding, said brushes being shiftable with said lever between first positions in which they bear on the commutator and second positions in which they bear on the respective collector rings, a control lever rockably carried by said rotor to swing about the rotor axis and having opposite ends operatively connected with said centrifugally actuated levers, and spring means acting on said control lever for urging said brushes to their first positions, said brush-carrying levers being centrifugally urged against the action of said spring means to shift said brushes to their second positions in which they bear on the respective collector rings.

References Cited in the file of this patent
UNITED STATES PATENTS

| | | |
|---|---|---|
| 1,227,815 | Meyer | May 29, 1917 |
| 2,740,930 | Johnson | Apr. 3, 1956 |
| 2,891,207 | Lee | June 16, 1959 |